United States Patent [19]

Breysse et al.

[11] Patent Number: 5,356,846
[45] Date of Patent: Oct. 18, 1994

[54] HYDROREFINING CATALYST CONTAINING RUTHENIUM SULPHIDE, ITS SYNTHESIS AND HYDROREFINING PROCESS USING THE SAID CATALYST

[75] Inventors: Michele Breysse, Caluire; Martine Cattenot, Villeurbanne; Thierry Des Courieres, Lyon; Christian Gachet, Ecully; Jean-Louis Portefaix, Caluire, all of France

[73] Assignee: Elf Antar France, Courbevoie, France

[21] Appl. No.: 967,135

[22] PCT Filed: Feb. 27, 1992

[86] PCT No.: PCT/FR92/00178
§ 371 Date: Dec. 28, 1992
§ 102(e) Date: Dec. 28, 1992

[87] PCT Pub. No.: WO92/15399
PCT Pub. Date: Sep. 17, 1992

[30] Foreign Application Priority Data
Feb. 28, 1991 [FR] France .................. 91 02404

[51] Int. Cl.$^5$ .............................. B01J 29/08
[52] U.S. Cl. ......................... 502/64; 502/66; 502/74; 502/79
[58] Field of Search ............. 502/74, 66, 64, 79

[56] References Cited

U.S. PATENT DOCUMENTS 5,122,489  6/1992  Dessau ................. 502/74

FOREIGN PATENT DOCUMENTS 8601743  3/1986  PCT Int'l Appl. .......... B01J 29/12
9215399  9/1992  PCT Int'l Appl. .......... B01J 29/06

OTHER PUBLICATIONS

Chemistry and Industry, Feb. 5, 1977, B. Coughlan et al., "Ruthenium Zeolite Hydrogenation Catalysts", pp. 125–127.

Primary Examiner—Paul Lieberman
Assistant Examiner—P. L. Hailey
Attorney, Agent, or Firm—Burgess, Ryan & Wayne

[57] ABSTRACT

The present invention relates to a hydrorefining catalyst containing ruthenium sulphide including the synthesis thereof and also to a process for hydrorefining hydrocarbon feedstocks using the aforementioned catalyst.

27 Claims, No Drawings

HYDROREFINING CATALYST CONTAINING RUTHENIUM SULPHIDE, ITS SYNTHESIS AND HYDROREFINING PROCESS USING THE SAID CATALYST

BACKGROUND OF THE INVENTION

1) Field of the Invention

The invention relates to a hydrorefining catalyst containing ruthenium sulphide, to its synthesis and to a process for hydrorefining hydrocarbon feedstocks using the said catalyst.

2) Background Art

Petroleum oil and the petroleum fractions obtained by distillation or treatment of petroleum oil are complex mixtures in which, besides hydrocarbons, there are compounds containing heteroatoms such as sulphur, nitrogen and oxygen. Heavy feedstocks, the use of which is becoming widespread, contain large quantities of heteroatomic compounds. These heavy feedstocks consist, for example, of heavy crudes, of bituminous schists or of heavy residues from oil refineries.

The heteroatomic compounds are impurities which are detrimental to the good quality of petroleum products. They are responsible in particular for problems linked with contamination, corrosion, odor and stability. Sulphur and nitrogen compounds can also poison the usual catalysts for the refining processes.

It is therefore important to remove them during the refining. In general this involves a hydrogen treatment in the presence of a catalyst which promotes the rupture of the carbon-heteroatom bonds. This treatment is called hydrorefining.

The main hydrorefining reactions are desulphurization and denitrification. Desulphurization consists in converting the sulphur contained in the organic compounds into hydrogen sulphide. Denitrification consists in converting the nitrogen in the organic compounds into ammonia.

Considerable research effort has been deployed to find effective hydrorefining catalysts which resist deactivation by heteroatoms.

The most commonly employed hydrorefining catalysts are based on nickel, molybdenum, tungsten or cobalt. These metals are deposited onto supports by impregnation with the aid of their water-soluble salts and are then converted into sulphides.

The supports are generally based on refractory oxides such as alumina or silica-aluminas.

The use of zeolite supports has also been investigated.

The crystalline structure of zeolites consists of $AlO_4$ and of $SiO_4$ tetrahedra joined together by oxygen atoms common to two tetrahedra. The three-dimensional framework formed by the assembly of these tetrahedra has cavities and channels which accommodate the cations compensating for the charge deficit linked with the presence of trivalent ammonium in the $AlO_4$ tetrahedra. Before the catalysts are prepared, these compensating cations are exchanged with hydrogen ions.

The catalytically active forms are obtained by introduction of metals with a catalytic effect into this acidic form.

Phillips Petroleum U.S. Pat. No. 4,324,647 describes, for example, a hydrocracking, hydrodesulphurizing and hydrodenitrifying process using a catalyst based on zeolite Y. This zeolite is employed in acidic form. Its sodium concentration is preferably below 0.2% by weight.

Patent Application PCT WO 86/01743 suggests associating a zeolite Y preferably containing 0.5 to 3% by weight of ruthenium with the conventional bimetallic hydrotreatment catalysts on alumina. Here again the zeolite is employed in acidic form.

SUMMARY OF THE INVENTION

We have surprisingly found that the use of catalysts containing ruthenium nonacidic zeolite makes it possible to improve the performance of the catalyst in desulphurization and above all in denitrification.

This invention relates to a catalyst for hydrorefining hydrocarbon feedstocks, containing ruthenium sulphide on zeolite, characterized in that the zeolite is in nonacidic form.

DESCRIPTION OF THE PREFERRED EMBODIMENTS

By nonacidic zeolite we mean a zeolite in which the acidic sites are practically all neutralized by a metal.

This may be ruthenium by itself, but generally the zeolite also contains another metal, generally an alkali metal such as lithium, sodium, potassium, rubidium or caesium. The potassium form is preferably employed, being easily accessible from raw materials which are low in cost and whose acidity is very low.

Dealumination greatly decreases the acidity of the zeolite, since the acidity is linked with the presence of trivalent aluminum. It is therefore advantageous to employ the zeolites in dealuminized form.

The acidity of the zeolite supports has been measured by stagewise thermodesorption of ammonia.

A sample of catalyst pretreated under helium at 500° C. and then cooled to the adsorption temperature is poisoned with ammonia. After a purge under vacuum the temperature is raised in 50° C. stages. The desorbed ammonia is then entrained by helium towards a katharometer detector. The total quantity of ammonia is collected in a flask of sulphuric acid which will subsequently be determined with sodiumhydroxide. Recording of the desorption peaks makes it possible to plot the histogram of the quantities of ammonia desorbed during the various stages and thus to estimate the distribution of the acidic forces.

The strong acidity corresponds to the sites which desorb from 350° C. upwards. Under these conditions the strong acidity, expressed in milliequivalents of $H^+$ per gram of catalyst, varies from 0.04 in the case of a potassium zeolite Y which has an Si/Al atomic ratio of 2.5 to less than 0.01 in the case of a potassium zeolite Y which has an Si/Al ratio of 5.9. The dealuminized form therefore has practically no strongly acidic sites.

According to the invention, zeolites in which the strong acidity is lower than 0.1 milliequivalents of $H^+$ per gram of catalyst are preferably employed.

The zeolites employed are of natural or synthetic origin. They are chosen in particular from zeolites which have pores whose diameter is greater than or equal to 0.5 nm.

Among these zeolites there may be mentioned beta zeolite, offretite, mordenite and FMI.

Zeolites from the faujasite class and particularly zeolite Y are preferably employed.

Zeolite Y is a synthetic zeolite, the synthesis of which is described in a Union Carbide U.S. patent (U.S. Pat. No. 4,130,007).

Like all the zeolites from the faujasite structural class, zeolite Y has interconnected channels approximately 0.8 nm in diameter. Because of the size of its channels it is therefore suitable for the reaction of the hindering molecules encountered in petrochemistry.

Zeolite Y is obtained by hydrothermal crystallization of sodium aluminosilicate gels. It corresponds to the general formula, expressed in moles of oxides:

$$0.9 \pm 0.2 Na_2O : Al_2O_3 : w\ SiO_2 : xH_2O$$

where x is generally below 9 and w is between 3 and 6. w is generally equal to 5, which corresponds to an Si/Al atomic ratio of 2.5. This ratio can be increased by dealuminizing.

Zeolite Y is obtained by synthesis in the form of sodium salt.

The potassium form of zeolite Y is obtained by exchange of the sodium form or of the acidic form with a potassium salt such as potassium nitrate.

The preferred catalyst according to the invention is a zeolite Y containing ruthenium sulphide and potassium. Zeolite Y is advantageously employed in dealuminized form.

The Si/Al atomic ratio of dealuminized zeolite Y is higher than or equal to 3. It is preferably between 3 and 10.

Between 0.5 and 20% by weight of ruthenium is generally introduced into the zeolite. This quantity is generally between 1 and 5% and preferably between 1.5 and 3% by weight.

Nonacidic zeolites containing ruthenium sulphide can be employed by themselves as hydrorefining catalysts but it is much more advantageous to employ them in combination with conventional hydrorefining catalysts.

These are generally alumina-based catalysts containing metals such as nickel, molybdenum, tungsten or cobalt. The catalytic solid contains between 5 and 90% by weight, preferably between 10 and 60% or, better, between 15 and 60% of zeolite.

Zeolites in nonacidic form are preferably employed for the synthesis of the catalysts according to the invention. They are generally zeolites containing alkali metals.

The potassium form is preferably employed, being easily accessible from raw materials of relatively low cost and whose acidity is very low.

During the synthesis of the catalysts a part or all of the alkali metal of the zeolite is exchanged with ruthenium by impregnating the zeolite with an aqueous or organic solution of a ruthenium salt. Ruthenium trichloride and hexaaminoruthenium are employed in the form of aqueous solutions, dodecacarbonylruthenium is employed in the form of solution in benzene.

The zeolite is impregnated, for example, with a dilute aqueous solution of $Ru(NH_3)_6$ for several days at room temperature. The solid obtained is washed with water and then dried. The catalysts are then sulphurized with a gas mixture containing hydrogen sulphide. This is generally a mixture of hydrogen sulphide with hydrogen or nitrogen. The sulphurization generally takes place in the hydrorefining reactor.

If the zeolites are employed as a mixture with a conventional hydrorefining catalyst, generally alumina-based, a physical mixture of the zeolite and of the alumina is produced.

The zeolite and the alumina are ground and the screened and the dried powders are mixed in a powder mixer.

Catalysts containing ruthenium sulphide on nonacidic zeolite can be employed by themselves or mixed with conventional alumina-based catalysts for all the hydrorefining reactions.

However, they are particularly efficient in the case of hydrodenitrification reactions. Mixtures containing nonacidic zeolites with rutheniumsulphide and conventional hydrorefining catalysts have the remarkable property that their hydrodenitrification action is not inhibited by the presence of quinolines.

It is known that commercial catalysts bring about the conversion of quinolines to alkylanilines quite easily, but the latter, while easily denitrified when pure, undergo very little conversion in the presence of quinolines. An accumulation of alkylanilines therefore takes place in the feedstocks, and this currently constitutes one of the main limitations on denitrification yields obtained in refining.

Mixtures of nonacidic zeolites with ruthenium sulphide and with conventional catalysts, for example containing nickel-molybdenum on alumina, are very slightly inhibited by the presence of quinoline. Their catalytic effect on the denitrification of an alkyl-aniline such as diethylaniline decreases only very slightly in the presence of quinoline. This remains true even under mild operating conditions.

The operating conditions for making use of the catalyst according to the invention are those usually employed in hydrorefining processes. The temperature is between 250° and 500° C.

The liquid space velocity of the feedstock, expressed in $m^3$ of liquid feedstock per hour and per $m^3$ of catalyst, is generally between 0.2 and $6^{-1}$.

The total pressure is generally between 1 and 80 bars.

The following examples illustrate the invention without, however, limiting it.

EXAMPLE 1:

50 g of sodium zeolite Y (NAY) supplied by Union Carbide (type LZ-Y52) are subjected to three successive exchanges in a liter of an aqueous solution containing 1 mole per liter of $KNO_3$ for 24 hours at 60° C. Between each exchange the solid is washed with this solution.

After the last exchange it is washed three times with demineralized water and then dried at 120° C. for 18 hours in air.

5 g of this zeolite of this zeolite are exchanged with 0.5 g of $Ru(NH_3)_6Cl_3$ (Johnson-Matthey) dissolved in 0.5 l of deionized water, at 20° C. for 48 hours. After exchange, the solid is washed three times with deionized water and then dried for 18 hours at 120° C. in air.

The zeolite (RuKY) obtained contains 2.3% by weight of ruthenium. The Si/Al atomic ratio is 2.5.

EXAMPLE 2

A dealuminized zeolite HY is supplied by Conteka (reference CBV 712)

| | |
|---|---|
| $SiO_2/Al_2O_3$ (mol %) | 12 |
| $Na_2O$ (weight %) | 0.1 |
| unit mesh (nm) | 240.35 |
| specific surface ($m^2\ g^{-1}$) | 700 |

-continued

| Si/Al (atomic) | 6 |
| --- | --- |

This zeolite is calcined under oxygen according to the following method:
 rise to 200° C. over 3 hours
 plateau of 2 hours at 200° C.
 rise to 530° C. over 12 hours
 plateau of 4 hours at 530° C.

5 g of this calcined zeolite HY are exchanged three times in 500 ml of a 1M aqueous solution of $KNO_3$ at 55° C. for 24 hours. Between each exchange the solids are washed with the $KNO_3$ solution.

After three final washes with water they are dried at 120° C. for 18 hours.

5 g of this zeolite are exchanged with 0.5 g of $Ru(NH_3)_6C_3$ from Johnson-Matthey, dissolved in 0.5 l of deionized water, at 20° C. for 48 hours. After exchange, the solid is washed three times with deionized water and then dried in air at 120° C. for 18 hours.

The zeolite (RuKYd) obtained contains 1.8% by weight of ruthenium. The Si/Al atomic ratio is 5.9.

EXAMPLE 3

5 g of NaY zeolite supplied by Union Carbide (type LZ-Y52) are exchanged with 0.5 g of $Ru(NH_3)_6Cl_3$ (Johnson-Matthey) dissolved in 0.5 l of deionized water, at 20° C. for 48 h. After exchange, the solid is washed three times with deionized water and then dried in air at 120° C. for 18 h.

The zeolite (RuNaY) obtained contains 2.6% by weight of ruthenium. The Si/Al atomic ratio is 2.5.

EXAMPLE 4 (Comparative)

50 g of sodium zeolite Y (NAY) supplied by Union Carbide are subjected to two successive exchanges in 1 liter of an aqueous solution containing 1 mole per liter of $NH_4Cl$ at 20° C. for 24 h. Between each exchange, the solid is washed with this solution. After the last exchange it is washed three times with demineralized water and then dried at 120° C. for 18 h in air. This zeolite is calcined under oxygen at 530° C. following the method described in example 1.

5 g of this zeolite are exchanged with 0.5 g of $Ru(NH_3)_6Cl_3$ (Johnson-Matthey) dissolved in 0.5 l of deionized water, at 20° C. for 48 h. After exchange, the solid is washed three times with deionized water and then dried in air at 120° C. for 18 h. The zeolite obtained contains 2.3% by weight of ruthenium. The Si/Al atomic ratio is 2.5.

EXAMPLE 5 (Comparative)

2 g of alumina GFS-200 (Procatalyse), ground, screened (0.080 mm–0,125 mm fraction) and dried under vacuum at 110° C. for 18 hours, are impregnated without excess solution with 0.1828 g of $RuCl_3.3H_2O$ (Johnson-Matthey) in aqueous solution. The solid is then dried in air at 120° C. for 18 hours.

The alumina contained contains 2.5% by weight of ruthenium.

EXAMPLE 6

We have measured the activity of the catalysts of examples 1 to 5 in the reaction of hydrogenation (HN) of pyridine and of hydrodenitrification (HDN) of piperidine.

We have compared their activity with that of a commercial catalyst HR-346 from Procatalyse. This catalyst contains nickel-molybdenum on alumina.

The catalysts of examples 1 to 5 were sulphided at 400° C. for 4 hours under $N_2/H_2S$ containing 15% of $H_2S$. The catalyst HR-346 was sulphided at 400° C. for 4 h under $H_2/H_2S$ containing 15% of $H_2S$.

The reaction conditions are as follows:
 Total pressure = 30 bars
 Partial pressure of reactants = 26.6 kPa
 Partial pressure of $H_2S$ = 66.6 kPa
 Reaction temperature = 300° C.

The activity, expressed as intrinsic velocity ($Vi = 10^{-4}$ molec. $s^{-1}$ (at. metal)$^{-1}$) corresponds to the activity per gram of metal deposited on the catalyst.

The results appear in Table I. The most active catalysts are RuKYd and RuKY whose acidity is the weakest.

TABLE I

| Catalyst | Vi pyridine HN | Vi piperidine HDN |
| --- | --- | --- |
| Ex. 1 | 61 | 34 |
| 2 | 140 | 38 |
| 3 | 72 | 28 |
| 4 (comparative) | 52 | 19 |
| 5 (comparative) | 28 | 24 |
| HR-346 | 17 | 18 |

EXAMPLE 7

We have compared the activity of the catalysts prepared according to examples 1, 2, 3, 4 and 5 with the activity of commercial catalysts and the activity of equal-weight mixtures of catalysts 1, 2, 3, 4 and 5 with commercial catalysts, in the pyridine hydrogenation reaction.

Catalysts 1, 2, 3, 4 and 5 are mixed physically in equal-weight proportion with commercial catalysts supplied by Procatalyse:
 nickel-molybdenum/alumina (HR 346)
 cobalt-molybdenum/alumina (HR 306)

The mixing operations are carried out in a Turbula powder mixer after grinding, screening (0.040 mm –0.080 mm fraction) and drying the powders.

The catalysts were sulphided with a $N_2/H_2S$ mixture containing 15% of $H_2S$.

The pyridine hydrogenation reaction conditions are the following:
 total pressure = 30 bars
 partial pressure of pyridine = 26.6 kPa
 partial pressure of $H_2S$ = 66.6 kPa
 reaction temperature = 300° C.

We observe a synergy effect with the mixtures containing the zeolites of examples 1 to 3 and commercial catalysts both based on nickel-molybdenum and on cobalt-molybdenum on alumina. The RuHY (Ex.4) and ruthenium on alumina (Ex. 5) do not exhibit any synergy effect.

The activity of the catalysts is expressed as the specific velocity of the hydrogenation reaction. The specific velocity ($Vs = 10^{-8}$ mol $s^{-1}$ $g^{-1}$) corresponds to the activity per gram of catalyst.

The results appear in table 2.

TABLE 2

| Catalysts | $V_s$ |
| --- | --- |
| HR 346 | 115 |

TABLE 2-continued

| Catalysts | $V_s$ |
|---|---|
| HR 306 | 95 |
| Ex. 1 | 165 |
| Ex. 1 + HR 346 | 180 |
| Ex. 1 + HR 306 | 170 |
| Ex. 2 | 240 |
| Ex. 2 + HR 346 | 230 |
| Ex. 3 | 190 |
| Ex. 3 + HR 346 | 188 |
| Ex. 4 | 110 |
| Ex. 4 + HR 346 | 115 |
| Ex. 5 | 75 |
| Ex. 5 + HR 346 | 95 |

EXAMPLE 8

We have measured the activity of the catalysts of examples 1, 3 and 4 in the thiophene hydrodesulphurization reaction (HDS) under the following experimental conditions:

Total pressure = 1 bar
Partial pressure of thiophene = 2.4 kPa
Reaction temperature = 350° C.

The activity is expressed as a specific velocity ($V_s = 10^{-8}$ mol s$^{-1}$ g$^{-1}$) corresponding to the activity per gram of catalyst and as intrinsic velocity ($v_i = 10^{-4}$ molec. s$^{-1}$ (at.metal)$^{-1}$) corresponding to the activity per gram of metal deposited on the catalyst.

The results appear in table 3.

TABLE 3

| Catalyst | $V_s$ | $V_i$ |
|---|---|---|
| Example 1 | 71 | 31 |
| Example 3 | 12 | 4.6 |
| Example 4 | 8 | 3.4 |

EXAMPLE 9

We have compared the activity of catalysts 1, 2, 4 and of a commercial catalyst, employed by themselves, with the activity of the mixtures containing the catalysts 1, 2, 4 and a commercial catalyst in equal weight quantity. The reaction investigated is the hydrodenitrification of diethylaniline, by itself or mixed with quinoline.

The commercial catalyst is supplied by Procatalyse: Nickel-molybdenum/doped alumina (HR348)

The operating conditions at 30 and 60 bars are summarized in table 4.

TABLE 4

| Parameters | Total pressure | |
|---|---|---|
| | 60 bars | 30 bars |
| DEA pressure | 0.040 bar | 0.020 bar |
| H$_2$S pressure | 1.2 bar | 0.6 bar |
| Total flow rate | 100 l h$^{-1}$ | 50 l h$^{-1}$ |
| Temperature | 350° C. | 350° C. |
| Cat. mass | 0.5 g | 0.5 g |
| Solvent | n—C$_7$ | n—C$_7$ |
| Sulphiding agent | DMDS | DMDS |

We have measured the conversion (C) and the velocity of the reaction in mmol h$^{-1}$ g$^{-1}$ in the case of diethylaniline (DEA) by itself ($V_o$) and in the presence of 10% ($V_{10}$) and then 30% ($V_{30}$) of quinoline (Q).

It is clearly seen that inhibition by quinoline is greatly decreased in the presence of mixtures of catalysts 1 and 2 with commercial catalysts, whereas the mixture of catalyst 4 with commercial catalysts does not improve the activity of the latter.

In table 5 we summarize the conversions of hydrodenitrification of DEA and in table 6 the reaction velocity is expressed in mmol h$^{-1}$ g$^{-1}$ at 60 bars.

The same data at 30 bars appear in table 7. The properties of these catalysts are retained when the pressure decreases.

TABLE 5

| | DEA conversion (%) | | |
|---|---|---|---|
| Catalyst | Pure DEA | DEA + 10% Q | DEA + 30% Q |
| HR 348 | 90.8 | 52.5 | 18.5 |
| Ex. 1 | 60 | 25 | 17 |
| Ex. 2 | 100 | 20.6 | 10.5 |
| Ex. 4 | 56 | 10.3 | 5.4 |
| Ex. 1 + HR 348 | 99.6 | 72.9 | 46.4 |
| Ex. 2 + HR 348 | 100 | 84.5 | 59.2 |
| Ex. 4 + HR 348 | 100 | 48.0 | 29.2 |

TABLE 6

| Catalyst | Pure DE | DEA + 10% Q | | DEA + 30% Q | |
|---|---|---|---|---|---|
| | $V_0$ | $V_{10}$ | $V_0/V_{10}$ | $V_{30}$ | $V_0/V_{30}$ |
| HR 348 | 5.6 | 3.3 | 1.7 | 1.7 | 4.9 |
| Ex. 1 | 3.7 | 1.6 | 2.4 | 1.1 | 3.5 |
| Ex. 2 | 6.2 | 1.3 | 4.9 | 0.7 | 9.5 |
| Ex. 4 | 3.5 | 0.6 | 5.4 | 0.3 | 10.4 |
| Ex. 1 + HR 348 | 6.1 | 4.5 | 1.4 | 2.9 | 2.1 |
| Ex. 2 + HR 348 | 6.2 | 5.2 | 1.2 | 3.7 | 1.7 |
| Ex. 4 + HR 348 | 6.2 | 3.0 | 2.1 | 1.7 | 3.4 |

TABLE 7

| Catalyst | Pure DEA | | DEA + 10% | | | DE + 30% | | |
|---|---|---|---|---|---|---|---|---|
| | % C | $V_0$ | % C | $V_{10}$ | $V_0/V_{10}$ | % C | $V_{30}$ | $V_0/V_{30}$ |
| HR348 | 28 | 2.4 | 25.7 | 0.77 | 3.2 | 8.5 | 0.26 | 9.5 |
| Ex. 1 + HR348 | 71 | 2.1 | 32.2 | 0.97 | 2.2 | 18.6 | 0.56 | 3.8 |
| Ex. 2 + HR348 | 100 | 3.1 | 53.5 | 1.00 | 1.9 | 30.0 | 0.90 | 3.3 |

We claim:

1. Catalyst for hydrorefining hydrocarbon feedstocks, containing ruthenium sulphide on zeolite, characterised in that the zeolite is in nonacidic form.

2. Catalyst according to claim 1, wherein the zeolite contains ruthenium sulphide and at least one other metal.

3. Catalyst according to claim 2, characterised in that the metal is an alkali metal.

4. Catalyst according to claim 3 wherein the alkali metal is selected from the group consisting of lithium, sodium, potassium, rubidium and cesium.

5. Catalyst according to claim 4, wherein the alkali metal is potassium.

6. Catalyst according to claim 1, wherein the zeolite is employed in dealuminized form.

7. Catalyst according to claim 1, wherein the strong acidity of the zeolite determined by stagewise thermodesorption of ammonia and corresponding to the acidic sites of the zeolite desorbing ammonia from a temperature of at least 350° C., is lower than or equal to 0.1 milliequivalents of H+ per gram of catalyst.

8. Catalyst according to claim 1, wherein the zeolite is zeolites which have pores of diameter greater than or equal to 0.5 nm.

9. Catalyst according to claim 1, wherein the zeolite is selected from the group consisting of faujasite X, faujasite Y, omega zeolite, beta zeolite, offretite, mordenite and MFI.

10. Catalyst according to claim 1, wherein the zeolite is from the faujasite class.

11. Catalyst according to claim 10, wherein the zeolite is zeolite Y.

12. Catalyst according to claim 11, wherein the zeolite is zeolite Y containing ruthenium sulphide and potassium.

13. Catalyst according to claim 12, wherein the zeolite is dealuminized zeolite Y containing ruthenium sulphide and potassium.

14. Catalyst according to claim 13, wherein the silicon/aluminum atomic ratio is higher than or equal to 3 and preferably between 3 and 10.

15. Catalyst according to claim 1 which contains 0.5 to 20% by weight of ruthenium.

16. Catalyst according to claim 5, wherein contains 1 to 5% by weight and preferably 1.5 to 3% by weight of ruthenium.

17. Catalyst according to claim 1 which contains a conventional hydrorefining catalyst.

18. Catalyst according to claim 17, wherein the conventional hydrorefining catalyst is an alumina-based catalyst containing metals selected from the group consisting of nickel, molybdenum, cobalt and tungsten.

19. Catalyst according to claim 17 which contains 5 to 90% by weight and preferably between 10 and 60% of zeolite.

20. Catalyst according to claim 19, which contains between 15 and 60% by weight of zeolite.

21. Catalyst according to claim 17 which contains between 10 and 60% zeolite.

22. Process for hydrorefining of petroleum feedstocks, wherein a catalyst according to claim 1 to is employed.

23. Process for the synthesis of a catalyst according to claim 1 which comprises subjecting an alkaline form of the zeolite to at least a partial cation exchange with ruthenium by impregnating the zeolite with a solution of a ruthenium salt, and subjecting the zeolite to sulphurization with a gas mixture containing hydrogen sulphide.

24. Process according to claim 23, wherein the hydrorefining is a hydrodenitrification.

25. The process of claim 23 wherein the alkaline form is the potassium form.

26. The process of claim 23, wherein the solution of ruthenium salt is selected from the group consisting of aqueous salts and organic salts.

27. The process of claim 23 wherein the zeolite is mixed with a hydrorefining catalyst prior to sulphurization.

* * * * *